United States Patent
Fink et al.

(10) Patent No.: US 6,889,642 B2
(45) Date of Patent: May 10, 2005

(54) SLIDE RAIL WITH TWO COMPRESSION REGIONS

(75) Inventors: Thomas Fink, Dachau (DE); Stefan Zimmermann, Munich (DE); Peter Bachmair, Gauting (DE)

(73) Assignee: Joh. Winklhofer & Sohne GmbH und Co. KG, Munich (DE)

( * ) Notice: Subject to any disclaimer, the term of this patent is extended or adjusted under 35 U.S.C. 154(b) by 0 days.

(21) Appl. No.: 10/476,350

(22) PCT Filed: Jun. 14, 2002

(86) PCT No.: PCT/EP02/06602

§ 371 (c)(1),
(2), (4) Date: Apr. 2, 2004

(87) PCT Pub. No.: WO03/025427

PCT Pub. Date: Mar. 27, 2003

(65) Prior Publication Data

US 2004/0159296 A1 Aug. 19, 2004

(30) Foreign Application Priority Data

Sep. 19, 2001 (DE) .......................................... 201 15 472

(51) Int. Cl.[7] .................................................. F01L 1/02
(52) U.S. Cl. ............................. 123/90.31; 123/90.17; 474/111; 474/140; 474/162
(58) Field of Search ........................... 123/90.31, 90.17, 123/195 R, 195 A, 196 S, 198 D, 198 E; 474/111, 140, 158, 160, 162; 74/606 R

(56) References Cited

U.S. PATENT DOCUMENTS 6,213,073 B1    4/2001   Iwata
6,447,416 B1 *  9/2002   Jacques et al. ............. 474/111

FOREIGN PATENT DOCUMENTS

| DE | 19704899 C1 | 10/1998 |
| DE | 19851601 A1 | 5/2000 |
| DE | 19855627 A1 | 6/2000 |
| DE | 19905579 A1 | 8/2000 |
| EP | 1036956 A2 | 9/2000 |

* cited by examiner

Primary Examiner—Thomas Denion
Assistant Examiner—Kyle M. Riddle
(74) Attorney, Agent, or Firm—Marshall, Gerstein & Borun LLP

(57) ABSTRACT

The present invention relates to a tensioning rail for a traction drive, especially for an internal combustion engine, said tensioning rail comprising a fastening end section with a pivotable fastening means and a tensioning arm area having, at a predetermined distance from said pivotable fastening means, a pressure-application region for contact with a tensioning piston of a tensioning device, at least one second pressure-application region being arranged on the tensioning arm area at a predetermined different distance from said pivotable fastening means.

10 Claims, 4 Drawing Sheets

SLIDE RAIL WITH TWO COMPRESSION REGIONS

REFERENCE TO RELATED APPLICATIONS

This disclosure claims the benefit of the filing date of International Application No. PCT/EP02/06602, having an international filing date of Jun. 14, 2002, which designated the United States of America, and this disclosure is the United States national stage of that international application. This disclosure further claims priority to Germany patent application DE 201 15 742.2, filed Sep. 19, 2001.

FIELD OF THE INVENTION

The present invention relates to a tensioning rail for a traction device, especially for an internal combustion engine, comprising a fastening end section with a pivotable fastening means and a tensioning arm area having, at a predetermined distance from said pivotable fastening means, a pressure-application region for contact with a tensioning piston of a tensioning device.

BACKGROUND OF THE INVENTION

Such tensioning rail arrangements with chain tensioners acting thereon are known especially for timing chain drives in internal combustion engines. The pivotable fastening means provided in the case of the tensioning rails are either an eyelet or a bushing pivotably supported on a pivot pin of the engine casing and chain housing, respectively, or the tensioning rail itself is provided with a pivot pin which is received in a suitable bearing reception means on the engine. The tensioning effect can be adjusted in dependence upon the distance from the thus given pivot axis and the selection of the tensioning means, especially a chain tensioner (which is in many cases connected to the hydraulic circuit of the engine). In view of the fact that the forces acting on the pressure-application region of the tensioning device are comparatively strong and in view of the fact that relative movements (slide-induced load) between the tensioning device and the tensioning rail occur in the case of many structural designs, specially implemented pressure-application regions are normally provided whose structural design is specially adapted to the pressure-application circumstances entailed by the tensioning device. In many cases, these pressure-application regions are implemented as reinforced areas and/or provided with lateral guide means for the tensioning device. A great variety of different structural designs can be chosen for the tensioning rail. The prior art discloses integral structures as well as multi-component structures. Recently, tensioning rails comprising a stable carrier structure and a specially designed slideway lining have gained more and more acceptance. This slideway lining is then pressed against the endless drive element, especially a chain, and is normally adapted to be replaced for reasons of wear. The prior art also discloses a great variety of materials or combinations of materials which can be used for the purpose in question. Also as far as the tensioning device is concerned, a large selection of differently designed structures is available. In most cases, the tensioning devices are provided with a spring-loaded tensioning piston which co-operates also with a pressure chamber communicating with the hydraulic circuit of the engine. For reasons of production engineering, attempts are frequently made to cut expenses, especially in the field of automotive engineering; in many cases, even minor advantages have a very positive effect, in view of the high numbers of pieces to be expected.

SUMMARY OF THE INVENTION

It is therefore the object of the present invention to provide a tensioning rail of the type mentioned at the start, which promises a cost benefit, especially when used in series production.

According to the present invention, this object is achieved in that, at a predetermined different distance from the pivotable fastening means, at least one second pressure-application region is arranged on the tensioning arm area.

This structural design provides a plurality of additional possibilities of installing such a tensioning rail. The tensioning rail can so to speak be used within the framework of a modular design system and can be designed such that it is adapted to more than a single case of application. The use of at least one second pressure-application region permits the arrangement of a completely different tensioning device as well as the arrangement of a tensioning device having the same or different structural features at a different distance from the pivotable fastening means. Such a tensioning rail could be used not only in an engine at different locations of a traction drive, but it could also be used for applications which are not related to an engine. Such multifarious possibilities of use exist, of course, not only in the field of automotive engineering. Such a tensioning rail leads to a reduced number of different components and, consequently, to lower storage expenses, etc. Also the piece number costs can be reduced on the basis of the higher number of pieces to be expected.

According to a preferred embodiment the first and/or second pressure-application region can be provided with a convex pressure-application surface. This imparts additional stability to the pressure-application regions. Furthermore, a more advantageous sliding movement of e.g. a tensioning piston of a tensioning device along the respective pressure-application region will be obtained. Also the thus obtained raised configuration (which could be referred to as pressure-application saddle) leads to advantageous application conditions for the tensioning device.

The pressure-application surfaces of the first and second pressure-application regions can be implemented as a substantially continuous wave profile. This means that two raised areas follow one another with an intermediate "trough" so that these raised areas can also be produced by subjecting the tensioning rail to a single profiling operation. The respective "wave crests" can then be given different structural designs for the respective special intended use.

According to one embodiment, the pressure-application surfaces are formed by the back of the tensioning rail. This is a very simple and low-priced embodiment of the pressure-application surfaces, especially in comparison with variants in which these pressure-application surfaces are arranged laterally on the tensioning rail.

In order to guide the tensioning device accurately, the first and/or second pressure-application region(s) can additionally be designed such that they are provided with a pressure-application surface implemented as a recessed slideway. In many cases this recessed slideway is provided in the form of a groove formed in the surface; this groove has then inserted therein e.g. the end of a tensioning piston of the tensioning device which is adapted to move on the slideway along the groove bottom. The whole structure is laterally fixed in this way.

In addition, the tensioning rail can comprise a carrier body and a slideway-lining body arranged thereon, the first and second pressure-application regions being arranged on said carrier body. The carrier body is in many cases formed of a reinforced material or of a material which is strong by nature so that also the pressure-application regions, which are subjected to high loads, can be formed of this material.

Another advantageous embodiment can be designed such that the carrier body is implemented as a truss profile provided with a continuous rear-surface rail forming the back, and that the rear-surface rail is wave-shaped in a certain area thereof so as to form the first and second pressure-application regions. Due to the fact that a continuous rear-surface rail is formed, the carrier body can be implemented very easily, whereby the pressure-application regions can be formed integrally due to the configuration of the rear-surface rail.

According to an advantageous embodiment, at least one support strut of the truss profile can be connected to the rear-surface rail between said first and second pressure-application regions. This will impart additional stability in particular to the carrier body in the area where pressure is applied by the tensioning device.

According to a preferred embodiment, a pivot axis of the pivotable fastening means can be given by a pivotable bushing integrated in the carrier body. Such a pivotable bushing can also be formed integrally with the carrier body from the same material. The tensioning rail can then easily be attached to a suitable pivot pin, e.g. the pivot pin of a chain housing.

Another advantageous embodiment provides e.g. the use of the tensioning rail for a traction drive of internal combustion engines having a first type of structural design and a second type of structural design, respectively. For this purpose, a tensioning rail for a traction drive of an internal combustion engine having a first type of structural design comprises a fastening end section, which is adapted to be attached to said first type of internal combustion engine such that it is pivotable about a pivot axis, and a tensioning arm area having, at a predetermined distance from said pivot axis, a pressure-application region for contact with a tensioning device which is effective in a first direction and/or which has a first type of structural design. In addition, the fastening end section can be adapted to be attached also to an internal combustion engine having a second type of structural design such that it is pivotable about said pivot axis, at least one second pressure-application region being arranged on the tensioning arm area at a different predetermined distance from said pivot axis, said second pressure-application region being used for contact with a tensioning device which is effective in a second direction and/or which has a second type of structural design. This geometrical design of the tensioning rail offers the possibility of using said rail in two internal combustion engines having different types of structural designs. An internal combustion engine having a first type of structural design could e.g. be a four-cylinder in-line engine, whereas the internal combustion engine having a second type of structural design could be a six-cylinder V-type engine. The tensioning rail would consequently be geometrically designed such that it could be used in both said internal combustion engines. Attention should only be paid to the fact that the fastening end section can be attached by the same or by a geometrically similar fastening element. For the tensioning devices of the other types of engines, a respective separate pressure-application region is then provided on the tensioning rail so that a tensioning characteristic adapted to the engine behaviour can be used. It is therefore possible to use a tensioning device which applies pressure in a different direction to the other pressure-application region and/or a tensioning device which has a different structural design and or which is effective in a different direction. The pressure-application regions are then adapted to the respective tensioning devices used in the various types of engines.

Another feature which can be provided in this respect is that the pressure-application surfaces of the first and second pressure-application regions have a curvature which is adapted to the respective distance to the pivot axis in co-ordination with the direction of operation and/or the structural design of said first or second tensioning device so that a substantially perpendicular application of pressure to the first pressure-application region through the first tensioning device and to the second pressure-application region through the second tensioning device is guaranteed throughout the operating area. Due to pivoting of the tensioning rail in the case of use and in the future case of wear of the traction means, also the position of the pressure-application region relative to the tensioning device will change. In order to permit the force to become effective in the best possible way, the pressure-application surface has a shape that compensates the pivotal movement of the tensioning rail so that the tensioning device can, as far as possible, always apply pressure to the pressure-application region at right angles thereto. This means, in most cases, an approximation to this optimal condition because it is definitely desirable that, in the case of larger pivotal displacements of the tensioning rail, also the force characteristics in the pressure-application region will be distributed in a different manner.

The present invention additionally relates to an internal combustion engine provided with a traction drive comprising a tensioning rail, which is arranged such that it is pivotable about a pivot axis, and a tensioning device, which presses the tensioning rail against an endless drive element, said tensioning rail being provided with a pressure-application region which is located at a predetermined distance from said pivot axis and to which pressure is applied by the tensioning device. The internal combustion engine is characterized in that, at another predetermined distance, the tensioning rail is provided with a further pressure-application region for a tensioning device. In the case of a single internal combustion engine it seems, at first sight, superfluous that the tensioning rail used is additionally provided with a further pressure-application region for a tensioning device. Assuming, however, that this tensioning rail could be used at a different location of the same engine or for an engine having a different structural design, the above-described advantages will already be obtained. If, however, a person skilled in the art considers the respective individual engine, it appears as if it were rather far-fetched to provide a second pressure-application region which is, at least for this relevant case of use, superfluous.

Reference should here additionally be made to the fact that the use of the term pressure-application region does not refer to arbitrary areas and shapes of a tensioning rail. On the contrary, this term should be interpreted such that it stands only for areas which, from the point of view of the relevant person skilled in the art, are apparently suitable for applying tensioning devices, especially with respect to the constant load to be expected. Due to a special shape or a reinforced structural design, these areas can often be discerned very easily.

BRIEF DESCRIPTION OF THE DRAWINGS

In the following, embodiments of the present invention will be explained in detail making reference to drawings, in which.

DETAILED DESCRIPTION OF THE INVENTION

Figure 1:
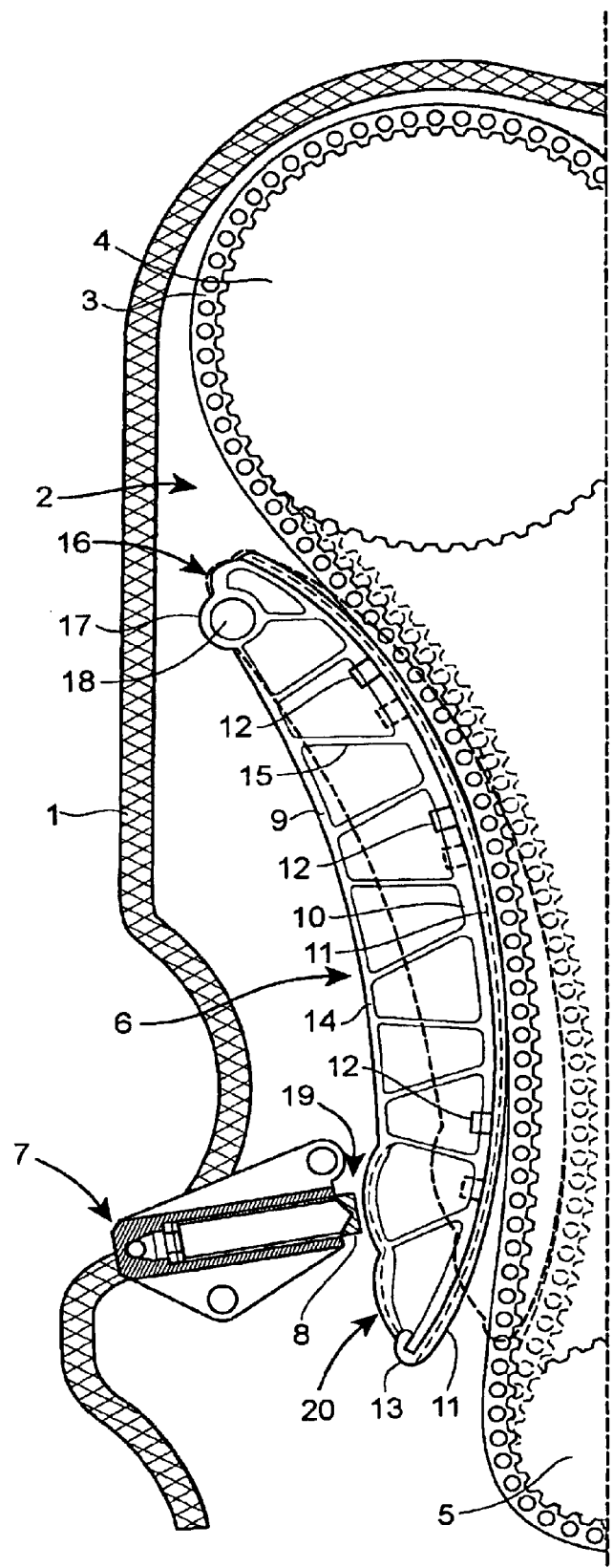
FIG. 1 shows a schematic representation of part of a timing chain drive of an internal combustion engine, a tensioning rail being shown at two operative positions.

FIG. 1 shows schematically part of the chain drive housing 1 of a timing chain drive of a four-cylinder in-line engine. The timing chain 3 is guided around the upper camshaft gear 4 and the lower camshaft gear 5. These two camshaft gears 4 and 5 have provided between them a pivotably arranged tensioning rail 6 which is pressed against the outer side of the chain through a chain tensioner 7. The chain tensioner 7 is a chain tensioner 7 which is secured to the engine and provided with a linearly displaceable tensioning piston 8, said tensioning piston being adapted to have applied thereto a tensioning force by a helical spring, which is not shown in detail, as well as via a pressure chamber (not shown in detail either) communicating with the engine oil hydraulic system. In general, any suitable embodiment of chain tensioners, which applies a force to the tensioning rail 6 in a suitable manner, can be used.

The tensioning rail 6 comprises a carrier body 9, which has a truss-type structural design and which is provided with a substantially continuous upper-surface rail 10 having arranged thereon an elongate slideway-lining body 11 which is connected to the carrier body. In the present case, the connection is established via locking elements 12 and a hook-shaped attachment area 13 at the front end of the slideway-lining body 11. This also allows a replacement of the slideway-lining body 11 in the case of wear. In addition, the slideway-lining body 11 is provided with a slide groove on the outer surface thereof, said slide groove having the timing chain 3 arranged therein.

Figure 2:
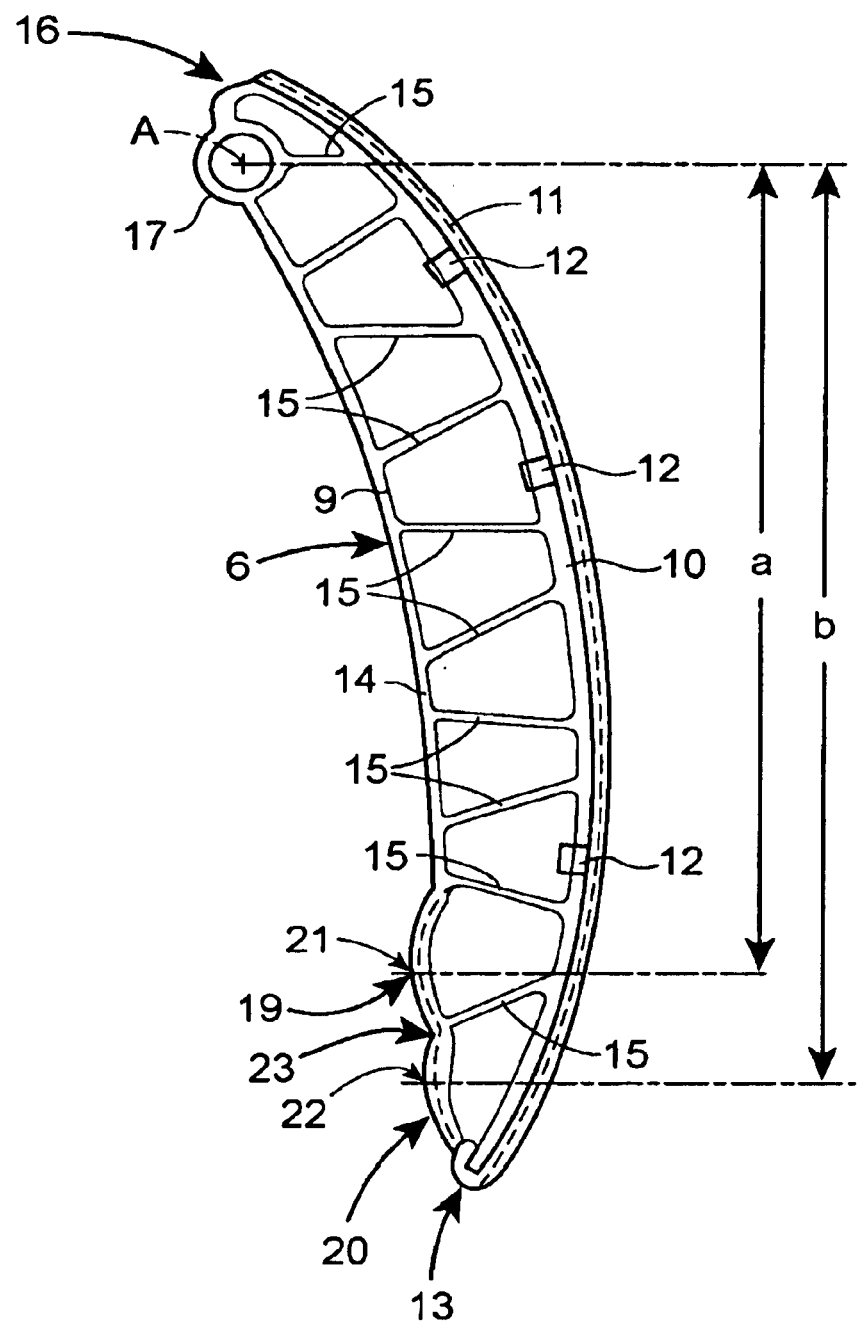
FIG. 2 shows a side view of the tensioning rail of FIG. 1.

Between the upper-surface rail 10 and the rear-surface rail 14 of the tensioning rail 6, a plurality of support struts 15 extends, said support struts 15 extending transversely to said upper-surface rail 10 and said rear-surface rail 14 so as to provide the truss structure. In the fastening end section 16 of the tensioning rail 6, a pivotable bushing 17 is integrated in the truss structure, said pivotable bushing 17 being pivotably attached to a pivot pin on the engine casing. The tensioning arm area extending towards the free end of the tensioning rail 6 is provided with two juxtaposed pressure-application regions 19 and 20. In the present arrangement, the chain tensioner 7 applies pressure to the first pressure-application region 19 of the tensioning rail 6. With the aid of FIG. 2, the structural design of the pressure-application regions 19 and 20 will now be explained in detail.

The pressure-application regions 19 and 20 are formed by a simple wave-shaped configuration of the rear-surface rail 14 at the front end area of the tensioning rail 6. The pressure-application surfaces 21 and 22 are each provided with a slideway groove which is slidably engaged by the free end of the respective associated tensioning piston 8 so that lateral guidance is given. The pressure-application surfaces are convex towards the chain tensioner so that they could also be referred to as raised pressure-application saddles. The respective centers of these pressure application surfaces 21 and 22, which are given by the direction of application or rather the center of application of the tensioning device in the initial mounting condition, are located at different distances from the pivot axis A. Pressure-application surface 21 is located at distance a and pressure-application surface 22 at distance b from said pivot axis. The wave trough 23 located between those two raised pressure-application regions 19 and 20 is supported on the upper surface rail 10 by one of the supporting struts.

On the basis of the different distances a and b, various tensioning possibilities are obtained, as expected.

Due to the use of two pressure-application regions 19 and 20, the tensioning rail 6 cannot only be used in a four-cylinder in-line engine in the case of use shown in FIG. 1, but it is also possible to use the same rail in a six-cylinder V-type engine, which is not shown in detail. In such a six-cylinder V-type engine the tensioning rail will again be articulated via an identically sized pivot pin 18; a tensioning device will then act on the second pressure-application region 20. This can be same tensioning device or some other tensioning device which has a different structural design and which is effective in a different direction.

Figure 3:
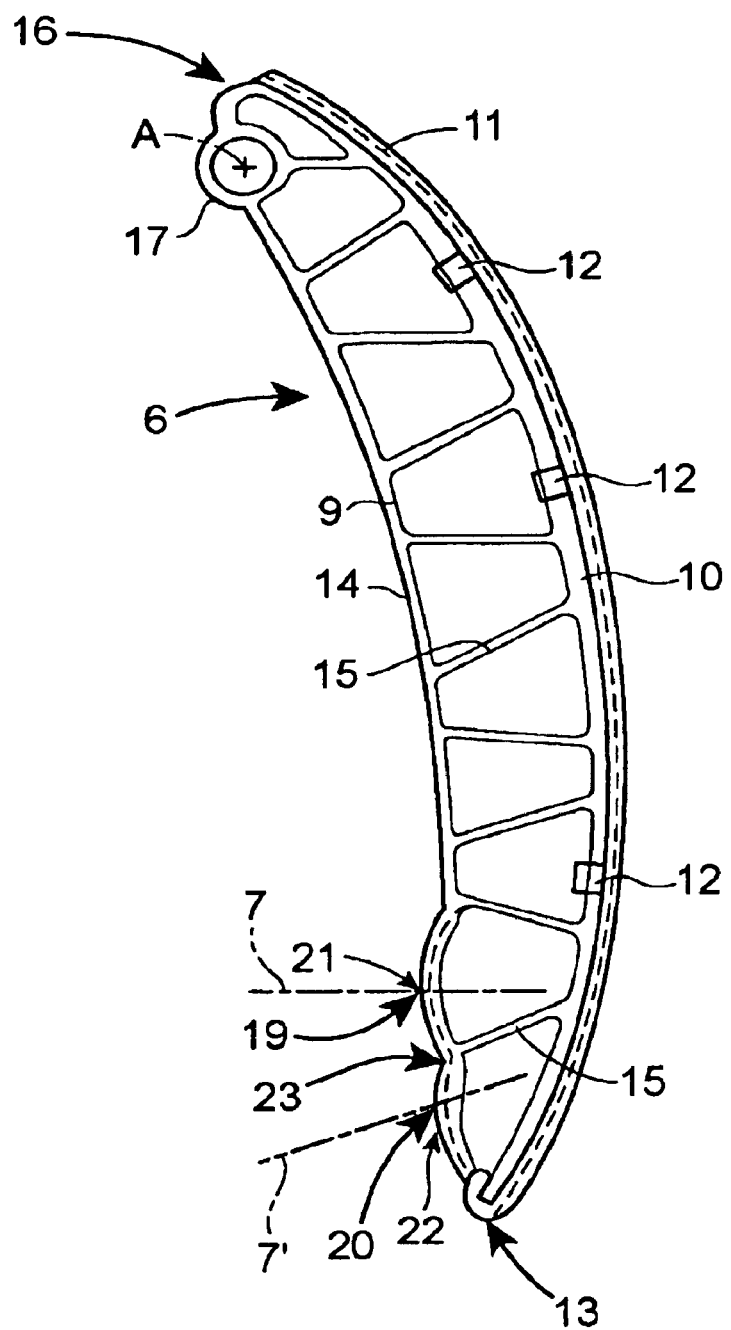
FIG. 3 shows a tensioning rail having the same type of structural design as the tensioning rail of FIG. 1, with schematically shown arrangement variants for the directions in which different tensioning devices are effective.
Figure 4:
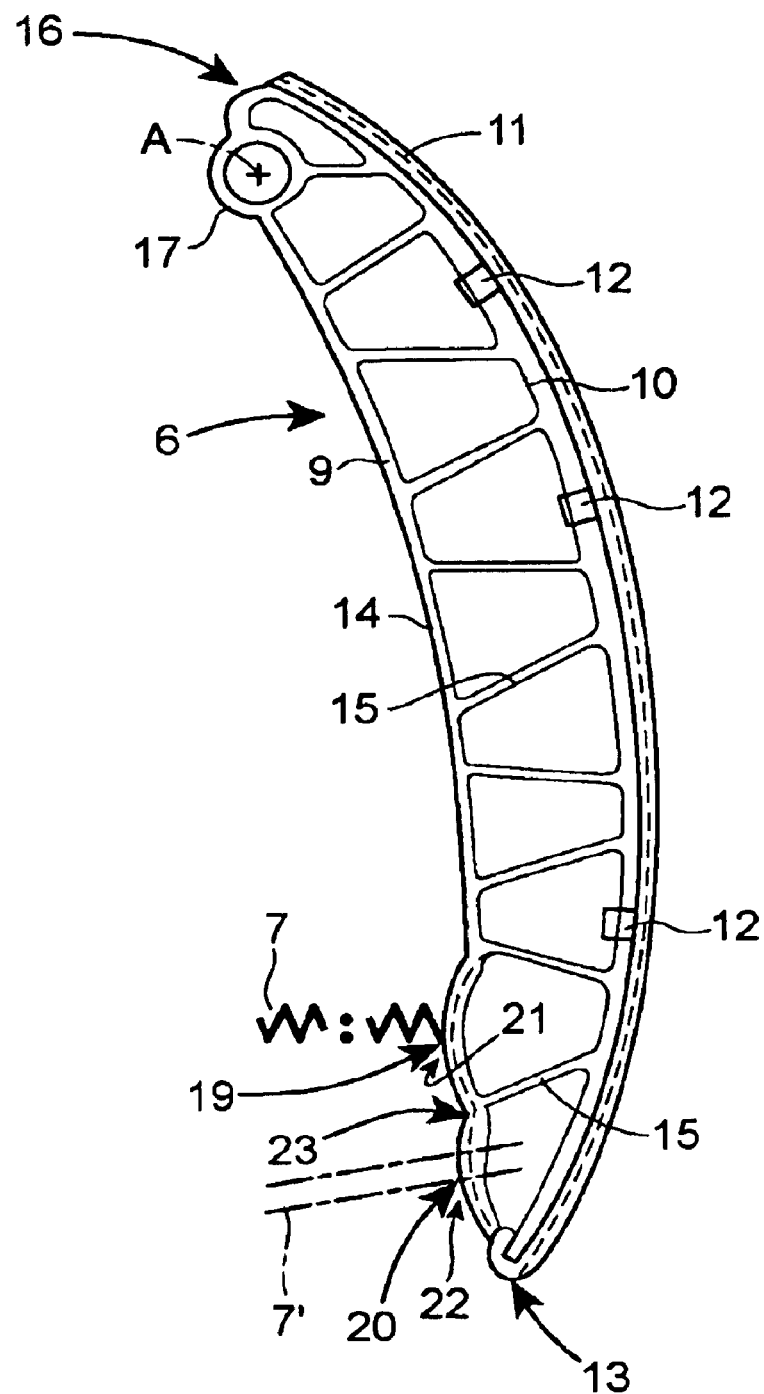
FIG. 4 shows a tensioning rail similar to the rail of FIG. 1, with schematically shown tensioning devices having different types of structural designs.

Making reference to FIGS. 3 and 4, different possibilities of arrangement are schematically outlined.

FIG. 3 shows the possibility of using identically designed tensioning devices in the case of the different types of engines, said tensioning devices applying, however, pressure at different angles to the respective associated pressure-application regions 19 and 20. In an extreme case, identical leverage ratios can be produced by the selection of the respective angles, in spite of the different distances of the two pressure-application regions 19 and 20 from the pivot axis A. The convex shape of the pressure-application regions 19 and 20 is then chosen such that a compensation contour for the pivotal tensioning movement of the tensioning rail 6 is given. This means that, when the tensioning rail 6 is pivoted anticlock-wise, the contour of the pressure-application surfaces 21 and 22 is chosen such that the tensioning piston 8 will always apply pressure to the pressure-application regions 19 and 20 as perpendicularly as possible.

On the basis of FIG. 4, it is schematically shown that it is also possible to use different tensioning devices 7, 7' in the case of the different engine embodiments, said different tensioning devices applying, however, pressure at the same angle.

It goes without saying that the various embodiments shown here can also be combined.

We claim:

1. A tensioning rail (6) for a traction drive (2) of an internal combustion engine having a first type of structural design, comprising a fastening end section (16) adapted to be attached to the first type of internal combustion engine and pivotable about a pivot axis (A), a tensioning arm area having, at a predetermined distance (a) from the pivot axis (A), a pressure-application region (19) for contact with a tensioning device (7) which is one of effective in a first direction and which has a first type of structural design, the fastening end section (16) being adapted to be attached also to a different location of the traction drive (2) of one of the first type of internal combustion engine and to an internal combustion engine having a second type of structural design such that the fastening end section (16) is pivotable about said pivot axis (A), and that at least one second pressure-application region (20) is arranged on the tensioning arm at a different predetermined distance (b) from the pivot axis (A), the second pressure-application region (20) being used for contact with a tensioning device (7') which is one of effective in a second direction and which has a second type of structural design.

2. A tensioning rail (6) according to claim 1, wherein one of the first, second, and both pressure-application regions (19) is provided with a convex pressure-application surface (21, 22).

3. A tensioning rail (6) according to claim 2, wherein the pressure-application surfaces (21, 22) of the first and second pressure-application regions (19, 20) have a curvature which is adapted to the respective distance (a, b) to the pivot axis (A) in coordination with one of the direction of operation and the structural design of one of the first and second tensioning device (7, 7') so that a substantially perpendicular application of pressure to the first pressure-application region (19) through the first tensioning device (7) and to the second pressure-application region (20) through the second tensioning device (7') is guaranteed throughout the operating area.

4. A tensioning rail (6) according to claim 2 or 3, wherein the pressure-application surfaces (21, 22) of the first and second pressure-application regions (19, 20) are implemented as a substantially continuous wave profile.

5. A tensioning rail (6) according to claim 2 or 3, wherein the pressure-application surfaces (21, 22) are formed by the back of the tensioning rail (6).

6. A tensioning rail (6) according to claim 1, wherein of the first, second, and both pressure-application region(s) (19, 20) is provided with a pressure-application surface (21, 22) implemented as a recessed slideway.

7. A tensioning rail (6) according to claim 1, and a carrier body (9) and a slideway-lining body (11) arranged thereon, the first and second pressure-application regions (19, 20) being arranged on said carrier body (9).

8. A tensioning rail (6) according to claim 7, wherein the carrier body (9) is implemented as a truss profile provided with a continuous rear-surface rail (14) forming the back, and that the rear-surface rail (14) is wave-shaped in a certain area thereof so as to form the first and second pressure-application regions (19, 20).

9. A tensioning rail (6) according to claim 8, wherein at least one support strut (15) of the truss profile is connected to the rear-surface rail (14) between the first and second pressure-application regions (19, 20).

10. A tensioning rail (6) according to claim 7, 8, or 9, wherein the pivotable fastening means (17) is defined by a pivotable bushing (17) integrated in the carrier body (9), the pivot axis (A) being given by the pivotable bushing (17).

* * * * *

UNITED STATES PATENT AND TRADEMARK OFFICE
CERTIFICATE OF CORRECTION

PATENT NO. : 6,889,642 B2
DATED : May 10, 2005
INVENTOR(S) : Thomas Fink et al.

It is certified that error appears in the above-identified patent and that said Letters Patent is hereby corrected as shown below:

Title page,
Item [73], Assignee, "Sohne" should be -- Söhne --.

Column 8,
Line 17, "claim" should be -- claims --.

Signed and Sealed this

Sixth Day of September, 2005

JON W. DUDAS
*Director of the United States Patent and Trademark Office*